United States Patent [19]

Davis

[11] Patent Number: 4,919,990

[45] Date of Patent: Apr. 24, 1990

[54] PAPER BUSTER

[76] Inventor: Gregory E. Davis, 2010 Holt Ave., #3, Los Angeles, Calif. 90034

[21] Appl. No.: 224,807

[22] Filed: Jul. 27, 1988

[51] Int. Cl.[5] .......................... B32B 3/06; B42F 3/00

[52] U.S. Cl. .................................... 428/100; 226/200; 428/131

[58] Field of Search .................. 428/100, 131; 226/75, 226/196, 200

[56] References Cited

U.S. PATENT DOCUMENTS

| | | | |
|---|---|---|---|
| 3,623,526 | 11/1971 | Robertson | 428/100 X |
| 3,667,462 | 6/1972 | Moon | 428/100 X |
| 4,249,689 | 2/1981 | Voytko | 226/172 |
| 4,340,633 | 7/1982 | Robbins, Jr. | 428/100 X |
| 4,757,931 | 7/1988 | Murasaki | 226/199 |
| 4,759,963 | 7/1988 | Uso, Jr. et al. | 428/100 |

*Primary Examiner*—Henry F. Epstein
*Attorney, Agent, or Firm*—Erik M. Arnhem

[57] ABSTRACT

A flexible panel or sheet adapted for installation in a printer for separating the incoming blank paper web from the outgoing printed paper web. The sheet is wide enough to span (overlap) perforations in edge areas of the paper that are used to pull the paper web through the printer. By providing a physical separation between the incoming paper and outgoing paper it becomes possible to prevent uneven paper backups, misfeeds or uneven paper movement caused by tiny slivers of paper lodging or catching in the drive perforations when the webs come into contact with each other. The separator sheet is attached to the printer by two spaced-apart straps that extend from the sheet around a pre-existing crossbar in the printer. The straps lie in the general plane of the separator sheet to minimize the sheet thickness; cutouts in corner areas of the sheet accommodate the straps. The straps are of adjustable length to permit optimum positionment of the separator sheet.

2 Claims, 1 Drawing Sheet

FIG. 1.
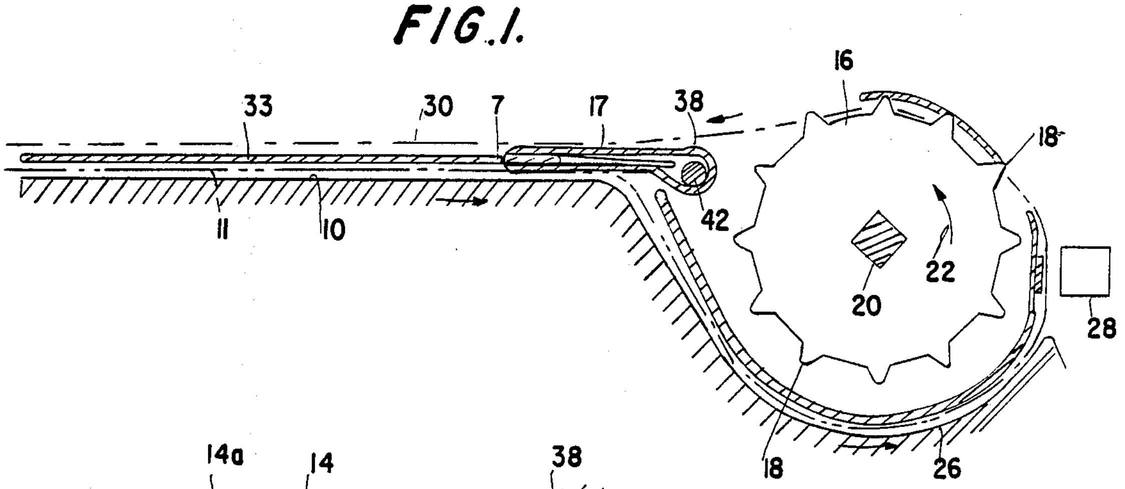
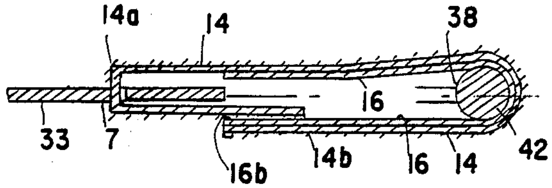
FIG. 3.
FIG. 2.
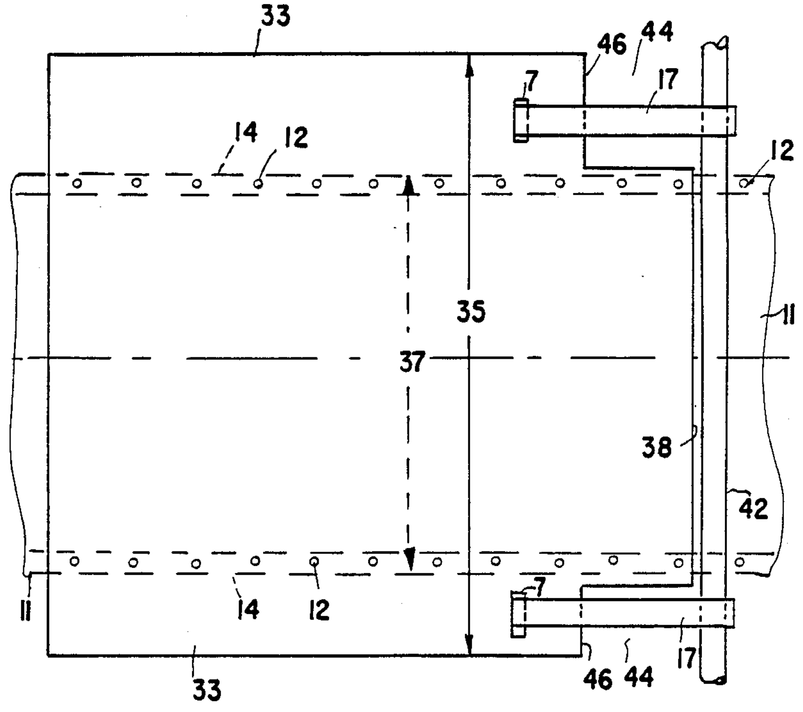

PAPER BUSTER

BACKGROUND AND SUMMARY OF THE INVENTION

This invention relates to computer printers that use paper having spaced perforations along its side edges. Commonly the printer has a paper drive mechanism that includes movable lugs (fingers) adapted to engage the perforations in the paper so as to move the paper through the printer. The outgoing paper is returned back toward the incoming paper, such the lower face of the outcoming paper comes into contact with the upper face of the incoming paper.

In some cases the intervening areas of the paper between adjacent perforations form sliver-like projections that can catch in the perforations on the other section of the sheet, thereby contributing to paper back-ups, misprints, snags, and rips in the paper.

The present invention contemplates an add-on flexible sheet for separating the outgoing paper from the incoming paper. The separator sheet is attached to a crossbar on the printer by means of two laterally-spaced flexible straps formed into loop configurations. Ends of the straps have mating surfaces formed of interlocking bristle materials, such that the strap ends can be separated to permit installation or removal to permit installation or removal of the flexible sheet. The flexible separator sheet can be installed on various conventional printers.

BRIEF DESCRIPTION OF THE DRAWINGS

FIG. 1 is a fragmentary sectional view taken through a conventional printer having one embodiment of the invention installed thereon.

FIG. 2 is a top plan view of a paper separator mechanism used in the FIG. 1 printer.

FIG. 3 is a fragmentary enlarged sectional view of a structural detail used in the FIG. 1 mechanism.

DESCRIPTION OF A PREFERRED EMBODIMENT OF THE INVENTION

FIG. 1 is a fragmentary sectional view taken through a conventional printer of the tractor feeder type. The printer includes a generally horizontal paper support surface 10 for guiding the incoming paper in a left-to-right direction; the incoming paper is shown by dashed lines 11 in FIG. 1.

As seen in FIG. 2, the paper has regularly spaced perforations 12 extending along its opposite side edges 14. The paper is drawn through the printer by a paper drive mechanism that includes two laterally spaced rollers 16 having peripheral lugs 18 adapted to enter into perforations 12 in the paper. Rollers 16 are affixed to a drive shaft 20 for rotation in the arrow 22 direction. The paper is drawn through a curved slot 26 and past a printing head 28. After passage around the drive rollers 16 the outgoing paper is returned in a right-to-left direction back toward the incoming paper section 11; numeral 30 designates the outgoing paper section.

The illustrated paper drive mechanism and paper travel path is conventional. My invention relates to a mechanism for separating the outgoing paper section 30 from the incoming paper section 11, so that any projecting slivers or ripped paper areas at the perforations 12 in one paper section will be prevented from engagement with perforations 12 in the other paper section.

The separating mechanism comprises a flexible sheet of material designated by numeral 33; the sheet may be a smooth vinyl plastic material. As seen in FIG. 2, separator sheet 33 has a width dimension 35 that is greater than the width dimension 37 of the paper sheet. The separator sheet is located between paper sections 11 and 30 to prevent any contact between the two paper sections.

Separator sheet 33 is located so that its downstream end edge 38 is in near abutment to a crossbar 42 that forms a part of the conventional printer device. The two downstream corners of sheet 33 are cut away to form free spaces designated generally by numerals 44; shoulder-like edges 46 are thereby formed on the sheet in spaced relation to crossbar 42. Attachment straps 17 are accommodated in spaces 44.

Each attachment strap 17 extends through a transverse slot 7 formed in sheet 33 near shoulder edges 46. Each strap is formed into a loop configuration so as to extend around crossbar 42, thereby attaching the associated separator sheet 33 to the printer structure.

Each strap 17 comprises two separate strips 14 and 16 secured together in back-to-back relation; the outer exposed surfaces of these strips have bristles of the interlocking hook and loop type, such that when the composite strap 17 is formed into a loop configuration the mating bristles will interlock to releasably attach the bristled surfaces together. Strips 14 and 16 are preferably formed of conventional friction adhesive materials sold under the tradename VELCRO. Strip 14 is longer than strip 16, such that a relatively thin section **14*a* of the composite strap can be extending through the associated slot 7 in separator sheet 33. The overlapped sections 14*b* and 16*b* of the two strips can have their bristle surfaces interlocked to maintain strap 17 in the loop configuration shown in FIG. 3. Strip sections 14*b* and 16*b* can be manually separated when it is desired to install or remove separator sheet 33. In its installed position sheet 33 acts as a separator between paper sections 11 and 30. Sheet 33 can extend leftwardly beyond the left edge of guide surface 10**, to ensure complete separation of the incoming sheet and outgoing sheet.

Having described the present invention in detail, what I claim is:

1. In association with a computer printer designed to use paper having spaced perforations along its side edges, wherein said printer has a horizontal paper in-feed surface, and a paper drive mechanism that includes movable lugs adpated to engage the perforations in the paper to return the outgoing paper back toward the incoming paper; said printer further comprising a crossbar in near adjacency to the drive mechanism above the paper in-feed surface, the improvement comprising means for separating the outgoing paper from the incoming paper, said separating means including a flexible sheet that is wider than the paper; said separating sheet extending over the incoming paper and underneath the outgoing paper, with its downstream edge in near abutment to the printer crossbar; said sheet having its downstream corners cut away to form shoulder edges spaced upstream from the crossbar; and two laterally spaced attachment straps connected to said sheet near its side edges, said straps extend around the crossbar; said straps having mating ends that can be disengaged from each other to install or remove the flexible sheet.

2. The improvement of claim 1 wherein said flexible sheet has transverse slots therein near its shoulder edges; said straps extending through said slots and around the crossbar in endless loops configurations; the mating ends of the straps having interlocking bristle surfaces that can be manually disengaged to open the loop configurations.

* * * * *